United States Patent [19]

Nourrcier

[11] Patent Number: 5,289,252
[45] Date of Patent: Feb. 22, 1994

[54] LINEAR FREQUENCY MODULATION CONTROL FOR FM LASER RADAR

[75] Inventor: Charles E. Nourrcier, Lakewood, Calif.

[73] Assignee: Hughes Aircraft Company, Los Angeles, Calif.

[21] Appl. No.: 987,888

[22] Filed: Dec. 8, 1992

[51] Int. Cl.$^5$ .......................... G01C 3/08; G01P 3/36; G03H 1/02; G03H 1/26
[52] U.S. Cl. ..................... 356/5; 356/28.5; 359/23; 359/27; 359/28
[58] Field of Search .................. 356/5, 28.5; 359/23, 359/27, 28

[56] References Cited

U.S. PATENT DOCUMENTS

| | | |
|---|---|---|
| 3,221,266 | 11/1965 | Vitkovits, Jr. . |
| 3,382,460 | 5/1968 | Blitz et al. . |
| 3,504,294 | 3/1970 | Martin, Jr. . |
| 3,895,294 | 7/1975 | Vinding . |
| 3,931,586 | 1/1976 | Carpenter . |
| 4,329,664 | 5/1982 | Javan ................................. 332/7.51 |
| 4,660,206 | 4/1987 | Halmos et al. ........................ 372/28 |
| 4,666,295 | 5/1987 | Duvall, III et al. . |
| 4,856,010 | 8/1989 | Wissman et al. ...................... 372/32 |
| 4,968,968 | 11/1990 | Taylor . |
| 5,003,546 | 3/1991 | Lidgard et al. ........................ 372/26 |
| 5,161,044 | 11/1992 | Nazarathy et al. .................. 359/157 |

OTHER PUBLICATIONS

"Stabilized Linear FM Generator", W. J. Caputi, IEEE Transactions On Aerospace and Electronic Systems, vol. AES-9, No. 5, Sep. 1973.

"High-Resolution Radar Coherent Linear FM Microwave Source", Bruce D. Campbell, IEEE Transactions On Aerospace and Electronic Systems vol. AES-6, No. 1, Jan. 1970.

Primary Examiner—Stephen C. Buczinski
Attorney, Agent, or Firm—Michael W. Sales; Wanda K. Denson-Low

[57] ABSTRACT

A closed loop frequency control system for maintaining accurate linearity in the transmitted signal (60) in a linear frequency modulated (LFM) chirped laser radar system. A correction signal (50), derived from an output pulse monitor is summed with the modulation waveform (18) to correct non-linearities in real time.

20 Claims, 2 Drawing Sheets

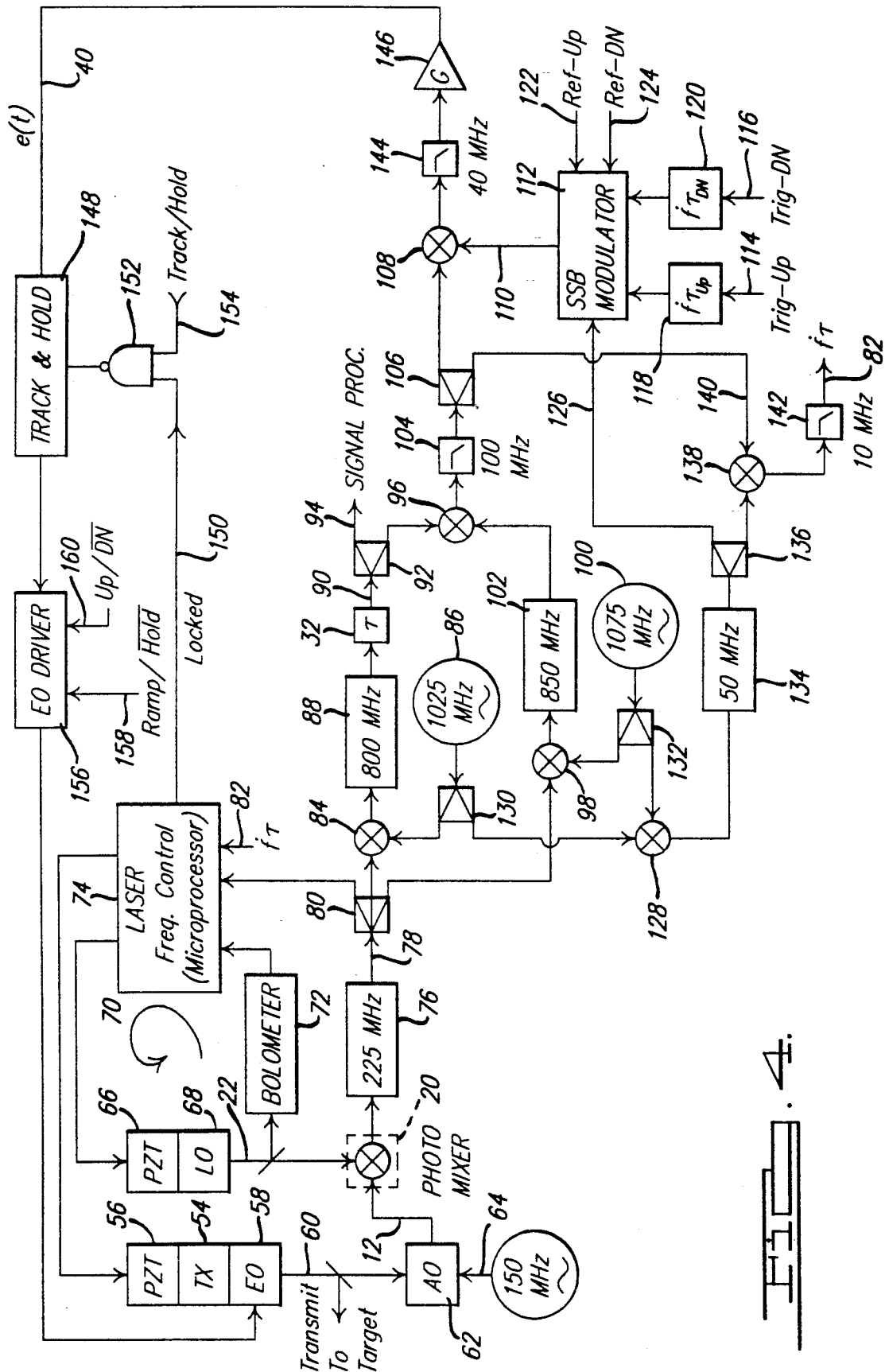

LINEAR FREQUENCY MODULATION CONTROL FOR FM LASER RADAR

BACKGROUND OF THE INVENTION

1. Field of Invention

This invention relates generally to linear frequency modulated (LFM) laser radar systems and, more particularly, to a frequency modulation control system for LFM laser radar which utilizes a closed loop feedback signal to maintain accurate linearity in the frequency modulation of the transmitted signal.

2. Discussion

Laser radar systems which employ an intensely focused beam of light to detect the presence, position and motion of objects, have been used in numerous applications, especially in the radar communications and measurement fields. Militarily, these systems have been implemented in conjunction with cruise missile and tactical fighter technology wherein laser radar has provided functions such as obstacle avoidance and terrain following. These laser radar systems enable sophisticated target homing capabilities for accurately guiding a missile or plane toward a target by using a distinguishing feature of that target.

Linear frequency modulated (LFM) "chirped" laser radar has proven to be particularly useful in these applications. A "chirped" laser radar system typically includes a continuous wave (CW) transmitter which emits laser light at a pre-selected center frequency. This emitted light is frequency modulated into linear "chirps" by passing it through an electro-optical device disposed within the cavity of the transmitter. A voltage versus time signal applied to this electro-optic device, typically an electro-optical crystal, creates a laser beam signal which varies in frequency with respect to time.

The exact shape of the modulated waveform can be varied in order to optimize trade-offs in efficiency, complexity and performance. A bi-directional type of waveform, as shown in FIG. 1, is often used to minimize range/doppler ambiguity in the system as well as to maximize the ambiguous range. To create this waveform, the radio frequency of each transmitted pulse is both increased and decreased at a constant rate within the length of the pulse. The frequency variation is preferably linear and the frequency versus time characteristic of the signal is often a trapezoid pattern as shown by the solid line in FIG. 1. Each chirp in this type of waveform includes an "up chirp" component wherein frequency is increasing and a "down chirp" component wherein frequency decreases.

A transmitted chirped signal is directed toward a target and then reflected back therefrom, creating a return signal or "echo" associated with the target. The time taken by the transmitted signal to reach the target and then return causes the return signal to be displaced in time with respect to the transmitted signal. This is shown graphically in FIG. 1 wherein the solid line represents the transmitted signal Tx and the dashed line shows a corresponding return signal Rx. The instantaneous frequency difference between these signals can be used to "demodulate" the return signal in order to obtain information about the target.

To obtain both long range detection capabilities as well as fine resolution, the laser radar system typically utilizes a relatively long coded pulse as the transmitted signal and then takes advantage of pulse compression of the return signal to obtain a narrower pulse. This enables achievement of the increased detection ability of a long pulse radar system while also retaining the range resolution capability of a narrow pulse system. Transmission of long pulses also permits a more efficient use of the average power capability of the radar without generating high peak power signals.

Pulse compression allows the transmission of modulated pulses of sufficient width to provide the average power necessary to illuminate targets, at a reasonable level of peak power. The received echoes are compressed by decoding their modulation to obtain the range accuracy and resolution equivalent to that of a short pulse. This is accomplished by increasing the transmitted signal bandwidth by modulating the frequency of the carrier within the transmitted pulse.

Methods of pulse compression are essentially matched filtering schemes in which the transmitted pulses are coded and the received pulses are passed through a filter whose time-frequency characteristic is the conjugate (opposite) of the coding. This function is usually performed within the signal processor used to process the received echo. The matched filter, usually a Sound Acoustic Wave (SAW) matched filter, introduces into the signal a time lag that is inversely proportional to frequency. The SAW filter, within its operating range, has a delay versus frequency characteristic which is matched to the frequency versus time characteristic of the return (and, therefore, also the transmitted) signal.

As illustrated in FIG. 2, a filter for compressing an up chirp has a signal transit time which decreases linearly with increasing frequency, at exactly the same rate as the frequency of the echo increases. The trailing portions of an up chirp echo, being of a progressively higher frequency, take less time to pass through the compression filter than the leading portions, thereby causing successive portions to bunch together and become compressed. When a pulse has been compressed by the filter, its amplitude is much greater and its width much less than when it entered. While the output echo may be only a fraction of the width of the received echo, it can have many times the peak power.

In order to ensure an accurate compression process, the frequency variations of the transmitted signal must be properly matched to the time-frequency characteristic of the filter, each preferably being precisely linear and having a constant slope. Non-linearities introduced into the transmitted signal may cause large sidelobes on either side of the compressed pulse which can make the system unreliable as an obscured second target detection sensor. Also, the compressed pulse width may become significantly larger than the capability of the SAW matched filter. This results in a decreased ability to measure range and reduces the ability to resolve multiple targets. Finally, non-linearity also causes reduced efficiency of integration which results in a lower signal to noise ratio.

A graphic illustration of such a non-linearity occurring in the up chirp component of the transmitted beam Tx(up) is shown in FIG. 1. The same type of non-linearity could also occur in an analogous fashion to the down chirp component TX(dn) but this is not shown in FIG. 1 for purposes of clarity. Such a non-linearity occurs where, for any given time segment, the frequency change in the transmitted signal is not constantly linear. This can also be thought of as an error in slope or a deviation from the desired linear slope of the ramped up or down chirp. If allowed to occur, this non-linearity is reflected back in the return signal Rx thereby causing the above-mentioned problems in the pulse compression process.

Constant increases in demand for longer operating ranges in LFM radar systems have been dramatically increasing the linearity requirements of the LFM modulated waveform. However, perfect linearity in the transmitted signal is difficult to achieve. This is mainly due to inherent limitations in the electro-optical crystal and its high voltage driver. Such high linearity requirements have proven impossible to achieve with conventional open loop laser radar systems. In these conventional open loop systems, a two percent linear slope error allows the system to be functional but not without problems. While various closed loop frequency control methods have been provided for other types of radars to help increase transmitted signal linearity in these systems, none have as yet been effectively applied to laser based radar systems, in particular LFM chirped laser radar.

There is therefore a need for a chirped LFM laser radar system which provides sufficient linearity to produce longer operating ranges than achievable with current systems.

SUMMARY OF THE INVENTION

The LFM laser radar frequency control system of the present invention provides a closed loop system capable of correcting non-linearities in the transmitted chirp waveform in real time. This permits the compressed pulse widths and sidelobe performance to be limited only by the SAW matched filter. To accomplish this, a beam of laser light is emitted at a preselected center frequency. The frequency of this beam is linearly modulated with respect to time in order to create a linear frequency modulated (LFM) beam. This beam is monitored and non-linearities in the modulation are sensed. An error correction signal, corresponding to the amount of non-linearity in the modulation, is generated and applied to the modulation waveform in order to compensate for these non-linearities. This provides corrections in real time to ensure linear modulation of the transmitted laser signal.

Additional objects, advantages and features of the present invention will become apparent from the following description and appended claims, taken in conjunction with the accompanying drawings.

BRIEF DESCRIPTION OF THE DRAWINGS

FIG. 4 is a more detailed block diagram of the laser electronics module of a laser radar system employing the frequency control system of the present invention.

DETAILED DESCRIPTION OF THE PREFERRED EMBODIMENT

Figure 1:
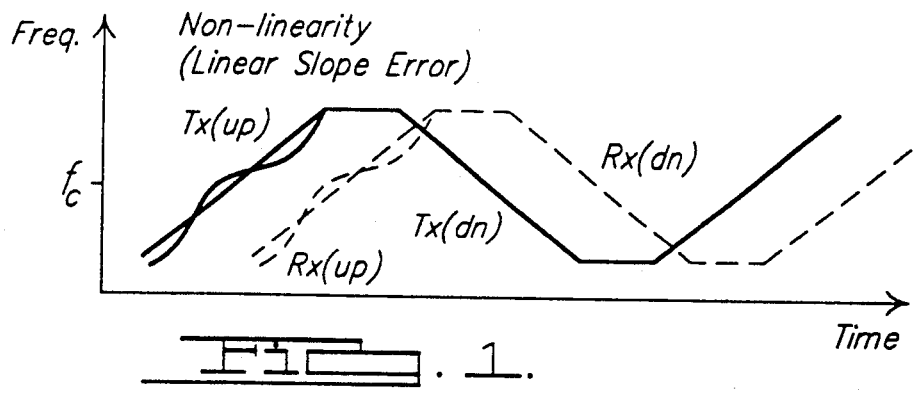
FIG. 1 is a graph illustrating the frequency versus time characteristics of a desired transmitted signal (solid line) and a corresponding return (dashed line) signal. Also illustrated in the graph is a typical non-linearity or linear slope error occurring in the up chirp components of the transmitted signal Tx(up) and the return signal Rx(up).
Figure 2:
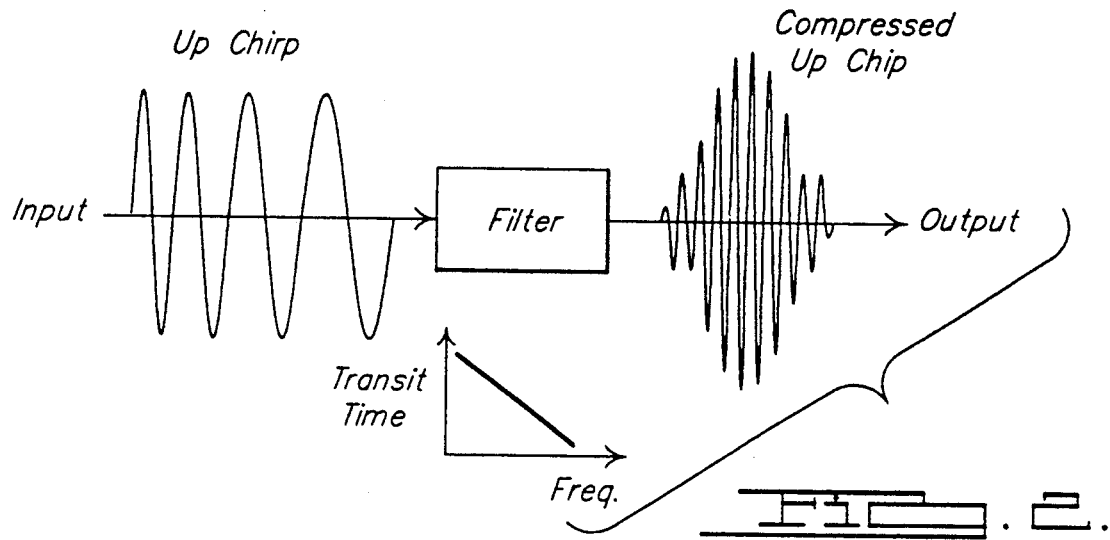
FIG. 2 illustrates pulse compression of an up chirp.
Figure 3:
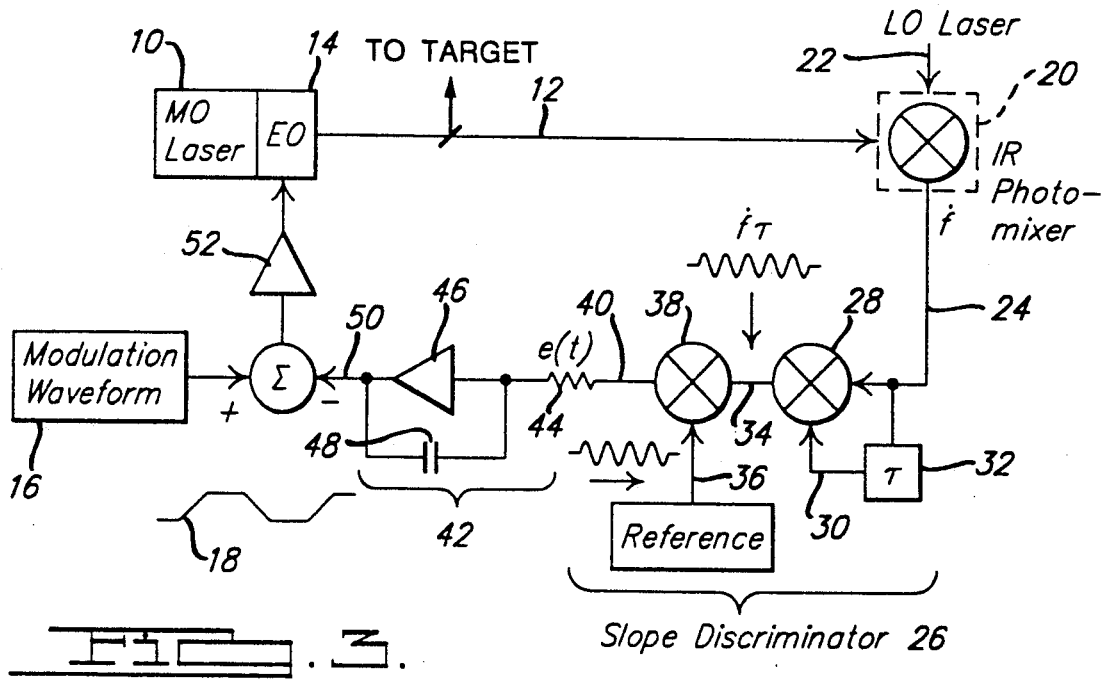
FIG. 3 is a block diagram illustrating conceptually the laser radar frequency control system of the present invention.

Referring now to the drawings, the frequency control concept employed by the laser radar system of the present invention is illustrated conceptually in the block diagram of FIG. 3. An optical beam of laser light is generated by a Master Oscillator (MO) laser 10 and modulated to create a chirp waveform 12 by electro-optical crystal 14. A modulation waveform generator 16 is responsive to a linear voltage 18 which varies with time in order to generate the desired waveform used to modulate the beam. When applied to the laser in electro-optical crystal 14, a linear frequency versus time optical signal is generated. The created chirp waveform 12 is the beam which is ultimately transmitted to the target (Tx in FIG. 1). This beam is preferably trapezoidal in shape with each pulse having an up chirp and down chirp as shown in FIG. 1, but may also be of any other suitable form.

A portion of modulated beam 12 is retained for use in the frequency control system of the present invention. The retained portion of beam 12 is mixed at infrared photomixer 20 with a Local Oscillator (LO) generated laser beam 22. This produces an electronic signal 24 having a modulation waveform which can be represented by f. This electronic waveform 24 is centered at a predetermined intermediate frequency that is determined by the difference between the center frequencies of the LO 22 and MO 10 lasers, the summed signal component out of photomixer 20 being attenuated because its high frequency is difficult to detect with the system electronics. Electronic signal 24 is then fed into a slope discriminator 26.

Slope discriminator 26 includes a mixer 28 which is fed by the modulated electronic signal 24 and a delayed version 30 of the same modulated signal 24, the delay being introduced by a delay line 32 which is preferably a coax transmission line long enough to produce a delay of a predetermined amount, in this case $\tau$. If the modulation of signal 24 is linear, the output 34 of the mixer 28 will be a sinewave at a frequency equal to the delay ($\tau$) times the rate of modulation (f). If, on the other hand, the modulation is non-linear, the output of mixer is not a sinewave at f$\tau$. Instead, the frequency of this waveform changes as a function of the active chirp modulation f, since the time delay $\tau$ is fixed. This delay line and mixer combination is therefore able to sense the slope of the output signal as well as any difference in that slope from the desired linear slope.

To accomplish this, the output signal 34 of mixer 28 is compared with a reference signal 36, preferably a sinewave at the same intermediate frequency as output signal 34 in mixer 38. If the modulation rate begins to increase or decrease in a non-constant or non-linear fashion, waveform 34 will then begin to advance or slip in phase with respect to reference signal 36. This difference results in an error voltage 40 which directly corresponds to this change in phase. The error voltage 40, proportional to the phase difference between the sinewave 34 and the reference signal 36, is also instantaneously equal to the instantaneous frequency error in the modulated signal 12.

This error voltage 40, after an integration by integrator 46, is used to produce a correction signal 50. A resistor 44 and capacitor 48 circuit is used to determine the control loop speed and compensation. Correction signal 50 is summed with the voltage output by the modulation waveform generator 16 and the resulting combined signal is amplified by an amplifier 52 and applied to electro-optic modulator crystal 14. By adding or subtracting the correction signal 50 from the voltage versus time waveform generated in generator 16, this compensates for non-linear deviations in the transmitted signal in order to force the resultant frequency versus time signal to be linear. In other words, the error signal precompensates for measured distortions in a retained portion of the transmitted signal.

FIG. 4 shows a more detailed block diagram of the laser electronics module of a laser radar system employing the frequency control system of the present invention. The implementation of the slope discriminator becomes complex because of the required loop bandwidth and the low isolation of the phase detector. However, as will be seen below, the control loop of the presently preferred embodiment is unique by the way it is apertured in the time domain to keep the system stable between chirp pulses.

The transmitted waveform Tx is originally produced by a transmit laser 54 and piezoelectric transducer 56 (which in combination comprise the master oscillator 10 shown in FIG. 3) along with electro-optic modulator 58. This produces the beam 60 which is transmitted toward the target. A portion of beam 60 is retained and modulated in acousto-optic modulator 52 with a 150 MHz local oscillator modulating signal 64 to produce a frequency shifted optical signal 12 which is used in the frequency control process.

A second piezoelectric transducer 66 expands or contracts an internal lens in order to control the frequency and output power of a laser beam generated by local oscillator laser 68 to produce optical signal 22. Lo laser 68 is operated at a frequency displaced from the center frequency of the transmitted beam 60 produced by transmit laser 54 by an arbitrary convenient amount, in this presently preferred embodiment 75 MHz.

The frequency shifted transmitted beam 12 is mixed with LO beam 22, in photomixer 20 to produce a signal having difference frequency of 225 MHz. However, it should be clear to one skilled in the art that this 225 MHz difference frequency was considered optimal after careful analysis for the system of the presently preferred embodiment but may alternately be any other convenient amount.

Precise frequency control of LO signal 22 is achieved by a frequency control loop 70. Loop 70 includes a bolometer 72, which measures power in a retained portion of the local oscillator beam 22, and a digital laser frequency control module 74. Frequency control module 74 is preferably a digital microprocessor which provides a control signal to piezoelectric transducers 56 and 66 to maintain a specific difference signal frequency out of photomixer 20, 225 MHz in this presently preferred embodiment, as well as to operate the Tx laser 54 at maximum power. The 225 MHz difference signal output by photomixer 20 is selected such as by a bandpass filter 76.

One portion of this difference signal 78 output by photomixer 20, which has been passed through a three-way power splitter 80, is input into laser frequency control module 74. This provides a sample of the difference signal 78 so that the laser frequency module can measure the frequency of the signal and precisely tune the Tx laser 54 so that this difference signal frequency equals the desired amount, 225 MHz. Also input into laser frequency control module 74 is a signal 82 which is a sinewave whose frequency is determined by the chirp slope f and delay τ in the slope detector. This signal is also used by module 74 for precisely controlling the 225 MHz frequency offset between the two lasers.

A second portion of the 225 MHz difference signal 78 is mixed in an electronic mixer 84 with a 1025 MHz signal generated by a local oscillator 86. The mixer 84 output signal contains sum and difference signals, at 1250 MHz and 800 MHz respectively. The 800 MHz signal is selected such as by a bandpass filter 88, and a time delay of τ is introduced into the signal via coax delay line 32. The time delay τ is chosen based on a number of parameters in order to optimize the ability to correct non-linearities.

The resulting delayed signal 90 is split in a two-way splitter 92, one portion of the signal being sent on for further signal processing as a system output 94 to a backscatter filter to be used as a reference signal and also used in the output pulse monitor. The other portion is sent on to electronic mixer 96 via splitter 92. In mixer 96 the delayed 800 MHz signal 90 is mixed with the third portion of the 225 MHz signal 78 output from splitter 80 which has first been mixed in mixer 98 with a 1075 MHz signal generated by local oscillator 100. From the resulting sum and difference signals, the 850 MHz difference signal is selected by bandpass filter 102 and input into mixer 96. The resulting signal is sent to a low pass filter 104 having a 100 MHz cutoff frequency. That result is then split into two portions by two-way splitter 106.

The first portion of the signal from splitter 106 is mixed in mixer 108 with an output signal 110 from single side band (SSB) modulator 112. SSB modulator 112, commonly called a single sideband mixer, is a special type of mixer capable of providing suppression of an unwanted sideband, either at the sum or difference frequency, without separate filtering. The inputs into SSB modulator 112 include various signals generated by a separate timing and control generator (not shown) which is preferably a digital microprocessor. These signals include Trig-up signal 114 and Trig-dn signal 116 which cause oscillators 118 and 120, respectively, to generate a gated sinewave at a predetermined frequency and starting phase. The gated sinewave must be restarted at the beginning of each chirp making a normal electronic mixer unable to perform this function since the filter would introduce excessive delay equal to approximately the inverse of the filter's bandwidth. Ref-up signal 122 and Ref-dn signal 124 also input into SSB modulator 112 are control signals which turn on oscillators 118 or 120 after these signals have been modulated by 50 MHz signal 126 so that the output of SSB modulator 112 can be used by mixer 108.

Signal 126 results from selecting the difference signal generated by mixing signals at frequencies of 1075 MHz and 1025 MHz in mixer 128. These signals are preferably generated by local oscillators 86 and 100 via splitters 130 and 132, respectively. This 50 MHz difference signal out of mixer 128 is preferably selected by 50 MHz bandpass filter 134 and split by splitter 136 into a second signal component mixed at mixer 138 with signal 140 split off by splitter 106. The output of mixer 138 is low pass filtered by 10 MHz filter 142 to obtain fτ signal 82 which is then input back into laser frequency control module 74.

The output of mixer 108 is low pass filtered at filter 144 which has a cutoff frequency of 40 MHz. Gain is added at amplifier 146 to result in error signal e(t) 40. This error signal 40 is input into track and hold amplifier 148 along with a locked output 150 of laser frequency control module 74 which has been input into a NAND gate 152 along with track/hold signal 154 generated by the timing and control generator. The track and hold amplifier 148 is used to keep the error signal close to zero when the laser frequency control module 74 is attempting to acquire laser lock as well as between up and down chirps. To accomplish this, the microcontroller in laser frequency control module 74 generates a low level locked signal during laser acquisition. Track/hold signal 154 goes to a logic low between chirps and a logic high during chirps. Therefore, during the chirp, the error signal is allowed to pass through the track and hold amplifier 148 in order to make corrections to the chirp slope. The frequency control system of the present invention can thereby be said to be apertured in the time domain, to maintain system stability between chirps.

The output of track and hold amplifier 148 is used as an input to the EO driver 156 along with signals 158 and 160 which are used to generate the up and down ramped waveform of the trapezoidally chirped signal. The EO driver 156 provides control signals to the electro-optical modulator 58 in order to create the chirp laser waveform as well as to generate and apply the correction signal in order to precompensate for measured distortions in the linearity of the chirp waveform.

This invention has been demonstrated to achieve the ability to reduce a chirp slope error of 10 percent to such a small error that the SAW filter can generate compressed pulses with sidelobe levels less than −35dB (the limit of the SAW device) for a waveform bandwidth time product of 350. This enables laser radar systems to have range accuracy and range resolution capabilities equal to or exceeding the pulse laser radar sensors at much longer ranges. Also, by modulating the baseband signal onto a carrier, loop speed is improved.

While the present invention has been described in connection with the presently preferred embodiments, one skilled in the art will appreciate that certain modifications and variations may be made thereto without departing from the spirit and scope of the invention as set forth in the appended claims.

I claim:

1. A frequency control system for maintaining linearity in the transmitted beam of a linear frequency modulated (LFM) laser radar system comprising:
   (a) transmitter means for emitting laser light at a preselected center frequency;
   (b) means for linearly modulating the frequency of said laser light with respect to time to create a linear frequency modulation beam;
   (c) means for sensing non-linearities in the modulation of said modulation beam;
   (d) means for generating a correction signal in response to said non-linearities sensed by said sensing means;
   (e) feedback means for applying said correction signal to said modulating means to compensate for said sensed non-linearities; and
   (f) means for mixing said modulated beam with a local oscillator generated beam to produce a difference signal of a predetermined frequency.

2. The system of claim 1 wherein said means for modulating includes an electro-optical crystal, said crystal being driven by a linearly increasing and decreasing voltage to effect said modulation of laser light.

3. The system of claim 2 wherein said correction signal is combined with said linearly increasing and decreasing modulating voltage to effect compensation for said non-linearities.

4. The system of claim 1 wherein said mixing means comprises a photomixer and said difference signal is electronic.

5. The system of claim 1 further comprising means for offsetting said modulated beam in frequency from said preselected center frequency by a predefined offset frequency prior to mixing with said local oscillator generated beam.

6. The system of claim 5 wherein said means for offsetting comprises a second local oscillator generated beam and an acousto-optic modulator.

7. The system of claim 1 wherein said means for sensing includes a means for introducing a time delay into said difference signal and a mixer, whereby said mixer is used to mix said difference signal with said time delayed difference signal to produce a resulting signal.

8. The system of claim 7 wherein said means for introducing a time delay is a coax delay line of a length which produces a predetermined time delay.

9. The system of claim 7 wherein said means for sensing further includes means for generating a sinewave at said difference frequency and means for mixing said sinewave with said resulting signal.

10. The system of claim 9 wherein said correction signal is derived from an error voltage proportional to the phase difference between said sinewave and said resulting signal.

11. The system of claim 1 wherein said linear frequency modulated beam is bi-directional, having both up chirp and down chirp components.

12. The system of claim 11 further comprising means for controlling said feedback means so that said compensation is made to said modulated signal only during the modulation of said up and down chirp components of said modulated beam.

13. The system of claim 12 wherein said control means includes a digital microprocessor.

14. The system of claim 1 wherein said correction signal varies in proportion to said sensed non-linearities in said modulation.

15. A method for maintaining linearity in the transmitted beam of a linear frequency modulated (LFM) laser radar system comprising the steps of:
   (a) emitting a beam of laser light at a preselected center frequency;
   (b) linearly modulating the frequency of said laser light beam to create said transmitted beam;
   (c) retaining a portion of said transmitted beam;
   (d) monitoring said retained portion of said modulated beam to detect non-linearities therein;
   (e) generating an error voltage which is proportional to the degree of non-linearity detected;
   (f) deriving an error correction signal from said error voltage;
   (g) applying said error correction signal to said linear modulation of said laser light beam to compensate for said detected non-linearity; and
   (h) modulating said retained portion of said transmitted beam onto a carrier signal.

16. The method of claim 15 wherein said carrier signal is a local oscillator generated laser beam and said carrier signal is mixed in a photomixer with said modulated beam.

17. A method for compensating for non-linearities in a transmitted beam of a linear frequency modulated (LFM) laser radar system comprising the steps of:
   (a) emitting a laser light beam at a preselected center frequency;
   (b) linearly modulating the frequency of said light beam with respect to time to create a linear frequency modulated transmitted beam;
   (c) retaining a portion of said transmitted beam;
   (d) mixing said retained portion of said transmitted beam with a local oscillator beam in a photomixer to produce an electronic signal representative of the transmitted beam and offset in frequency by an amount equal to the frequency difference between said local oscillator laser and said preselected center frequency of said laser light beam;
   (e) splitting said electronic signal into two portions and introducing a time delay into one of said portions;
   (f) mixing said delayed and undelayed portions of said electronic signal to produce a resulting signal;
   (g) mixing said resulting signal with a reference signal at a frequency substantially equal to said offset frequency to derive an error correction signal;
   (h) applying said error correction signal to said linear modulation of said light beam to compensate for non-linearities in the transmitted beam.

18. The method of claim 17 wherein said light beam is modulated using an electro-optical crystal, said crystal being driven by a time varying voltage, said error correction signal being applied thereto.

19. A frequency control system for maintaining linearity in the transmitted beam of a linear frequency modulated (LFM) chirped laser radar system comprising:
   (a) transmitter means for emitting laser light at a preselected center frequency;
   (b) means for linearly modulating the frequency of said laser light with respect to time to create a linear frequency modulation beam;
   (c) means for sensing non-linearities in the modulation of said modulation beam;
   (d) means for generating a real-time error correction signal in response to said non-linearities sensed by said sensing means; and
   (e) feedback means for applying said real-time error correction signal to said modulating means to compensate for said sensed non-linearities in said modulation.

20. A method for maintaining continuous linearity in the transmitted beam of a linear frequency modulated (LFM) chirped laser radar system comprising the steps of:
   (a) emitting a beam of laser light at a preselected center frequency;
   (b) linearly modulating the frequency of said laser light beam to create said transmitted beam;
   (c) retaining a portion of said transmitted beam;
   (d) monitoring said retained portion of said modulated beam to detect non-linearities therein;
   (e) generating an error voltage which is proportional to the degree of non-linearity detected;
   (f) deriving a real-time error correction signal from said error voltage;
   (g) applying said real-time error correction signal to said linear modulation of said laser light beam to compensate for said detected non-linearity in said modulation.

* * * * *